US008957809B2

(12) United States Patent
Cist (10) Patent No.: US 8,957,809 B2
(45) Date of Patent: Feb. 17, 2015

(54) MERGED GROUND PENETRATING RADAR DISPLAY FOR MULTIPLE ANTENNAS (75) Inventor: David B. Cist, Winchester, MA (US)

(73) Assignee: Geophysical Survey Systems, Inc., Salem, NH (US)

(*) Notice: Subject to any disclaimer, the term of this patent is extended or adjusted under 35 U.S.C. 154(b) by 385 days.

(21) Appl. No.: 13/588,183

(22) Filed: Aug. 17, 2012

(65) Prior Publication Data

US 2014/0022117 A1 Jan. 23, 2014

Related U.S. Application Data (60) Provisional application No. 61/672,902, filed on Jul. 18, 2012.

(51) Int. Cl.
*G01S 7/04* (2006.01)
*G01S 13/88* (2006.01)
*G01S 7/20* (2006.01)
*G01S 13/87* (2006.01)

(52) U.S. Cl.
CPC ............... *G01S 7/04* (2013.01); *G01S 13/885* (2013.01); *G01S 7/20* (2013.01); *G01S 13/87* (2013.01)
USPC ......................................... 342/176; 342/179

(58) Field of Classification Search
CPC .......... G01S 7/04; G01S 7/20; G01S 13/885; G01S 13/87
USPC ................................................. 342/176–184
See application file for complete search history.

(56) References Cited

U.S. PATENT DOCUMENTS 5,325,095 A 6/1994 Vadnais et al.
5,499,029 A 3/1996 Bashforth et al.
5,502,686 A 3/1996 Dory et al.
5,835,053 A 11/1998 Davis
(Continued)

FOREIGN PATENT DOCUMENTS

| EP | 2687867 A2 * | 1/2014 |
| WO | 03021967 | 3/2003 |
| WO | 2010014859 A2 | 2/2010 |

OTHER PUBLICATIONS

Vladimir Razevig et al., "Comparison of different methods for reconstruction of microwave holograms recorded by the subsurface radar", Ground Penetrating Radar, 2012 14th International Conference on, Jun. 4, 2012, pp. 331-335, IEEE, Shanghai.
(Continued)

*Primary Examiner* — John B Sotomayor
(74) *Attorney, Agent, or Firm* — Michael J. Feigin, Esq.; Feigin & Associates, LLC (57) ABSTRACT

In an embodiment of the disclosed technology, a visual output of data from a ground-penetrating radar is displayed on a visual medium. The display has a first exhibition of output from a higher frequency range antenna, a second exhibition of output from a lower frequency range antenna (compared to the other antenna; see definition in the "detailed description"), and a transition area between the first and second exhibition having merged data from the lower frequency antenna and the higher frequency antenna. The depth range of the transition area may be varied based on optimal depth range of each antenna, such as manually by a viewer viewing the visual output, which may occur in real-time, that is, while operating the radar and viewing the visual output thereof. Or, the transition depth range and/or width of the transition region may be varied as part of post-processing.

20 Claims, 9 Drawing Sheets

(56) References Cited

U.S. PATENT DOCUMENTS

| | | | |
|---|---|---|---|
| 5,835,054 A | 11/1998 | Warhus et al. | |
| 5,912,639 A | 6/1999 | Beckner | |
| 5,952,954 A | 9/1999 | Beckner | |
| 6,082,466 A | 7/2000 | Gudat | |
| 6,091,354 A | 7/2000 | Beckner et al. | |
| 6,094,157 A | 7/2000 | Cowdrick | |
| 6,154,167 A | 11/2000 | Annan et al. | |
| 6,308,787 B1 | 10/2001 | Alft | |
| 6,445,334 B1 | 9/2002 | Bradley et al. | |
| 6,496,136 B1 | 12/2002 | Mucciardi | |
| 6,496,137 B1 | 12/2002 | Johansson | |
| 6,501,413 B2 | 12/2002 | Annan et al. | |
| 6,603,422 B2 | 8/2003 | Wright | |
| 6,617,996 B2 | 9/2003 | Johansson et al. | |
| 6,664,914 B2 | 12/2003 | Longstaff et al. | |
| 6,700,526 B2 | 3/2004 | Witten | |
| 6,741,201 B1 | 5/2004 | De Jongth et al. | |
| 6,771,206 B2 | 8/2004 | Berthelier et al. | |
| 6,833,795 B1 | 12/2004 | Johnson et al. | |
| 6,940,446 B2 * | 9/2005 | Cist | 342/22 |
| 7,034,740 B2 | 4/2006 | Witten | |
| 7,167,124 B2 | 1/2007 | Annan et al. | |
| 7,218,267 B1 | 5/2007 | Weil | |
| 7,528,762 B2 | 5/2009 | Cerwin | |
| 7,586,433 B1 | 9/2009 | Johansson et al. | |
| 7,612,704 B2 | 11/2009 | Ryerson et al. | |
| 7,675,454 B2 | 3/2010 | Lavedas et al. | |
| 7,820,960 B2 | 10/2010 | Troxler | |
| 7,893,862 B2 | 2/2011 | Holly et al. | |
| 7,928,360 B2 | 4/2011 | Troxler | |
| 8,011,248 B2 | 9/2011 | Troxler | |
| 8,040,272 B1 | 10/2011 | Clodfelter et al. | |
| 8,071,937 B2 | 12/2011 | Troxler | |
| 8,112,242 B2 | 2/2012 | Troxler | |
| 8,884,807 B1 * | 11/2014 | Johansson et al. | 342/22 |
| 8,896,480 B1 * | 11/2014 | Wilson et al. | 342/26 B |
| 2005/0078028 A1 * | 4/2005 | Cist | 342/22 |
| 2006/0038710 A1 * | 2/2006 | Staszewski et al. | 341/143 |
| 2008/0079723 A1 | 4/2008 | Hanson et al. | |
| 2012/0029911 A1 * | 2/2012 | Noh et al. | 704/201 |
| 2012/0194550 A1 * | 8/2012 | Osterhout et al. | 345/633 |
| 2014/0015710 A1 * | 1/2014 | Jin | 342/25 F |
| 2014/0022117 A1 * | 1/2014 | Cist | 342/176 |

OTHER PUBLICATIONS

Vogt D, The effect of conductive borehole water on borehole radar, Ground Penetrating Radar, 2004, Proceedings of the Tenth International Conference on, Jun. 21, 2004, pp. 217-220, IEEE, Delft, The Netherlands.

* cited by examiner

MERGED GROUND PENETRATING RADAR DISPLAY FOR MULTIPLE ANTENNAS

FIELD OF THE DISCLOSED TECHNOLOGY

The disclosed technology relates generally to ground-penetrating radar (GPR), and, more specifically, to a technique for displaying GPR data.

BACKGROUND OF THE DISCLOSED TECHNOLOGY

GPR, or ground-penetrating RADAR (where RADAR is "RAdio Detection And Ranging), is a technology used to assess the composition and location of heterogeneous materials. GPR uses radio frequencies and is particularly useful in that it is both non-destructive and non-ionizing. In fact, GPR uses frequencies similar to a cellular phone, but at far lower power levels. Common applications include locating the precise position of rebar within a concrete wall/floor, identifying and locating buried objects underground, assessing the quality and uniformity of an asphalt or concrete highway surface, and detecting deterioration on bridge decks. In road surface applications, GPR is used, for example, to detect cracks, fissures, or contamination in any one of the chip seal, pavement layers, gravel base, and so forth. In many roadway applications, a resolution of features of the road surface of less than one inch (2.54 cm) is desired. Such systems may be mounted on vehicles, travelling over the surface while acquiring measurement data. GPR systems are disclosed in more detail in U.S. Pat. No. 5,499,029 to Bashforth, et al., and U.S. Pat. No. 5,384,715 to Lytton, which are hereby incorporated by reference.

Ground Penetrating Radar (GPR) antennas are built in different sizes for different uses. Smaller antennas are generally higher in frequency, have higher resolution for displaying finer details and are not able to penetrate as deep as lower frequency antennas. Larger antennas are generally lower in frequency, are able to penetrate deeper, but have a lower resolution, and so are not able to discriminate fine details. By performing a survey simultaneously with two antennas, a higher and a lower frequency model, the user is able to obtain the best of each antenna. The volume near the surface will have the best resolution, and the deeper volume will be viewed with the maximum range. Viewing the two separate pictures displayed can be difficult for the average user, even when viewed on the same monitor, as is the best practice currently known.

Therefore, when employing ground penetrating radar there is a need in the art to find a better way to present the shallow, fine details of high resolution with the deeper penetration information of low resolution.

SUMMARY OF THE DISCLOSED TECHNOLOGY

Therefore, it is an object of the disclosed technology to stitch (join in a continuous and smooth output) together outputs from GPR measurements by blending, so as to remove any visible break in the image. In this manner, the best known view of the subsurface being surveyed is provided, allowing for easier and more informative viewing than known in the prior art.

In an embodiment of the disclosed technology, a visual output of data from a ground-penetrating radar is displayed on a visual medium. The display has a first exhibition of output from a higher frequency range antenna, a second exhibition of output from a lower frequency range antenna (compared to the other antenna; see definition in the "detailed description"), and a transition area between the first and second exhibition having merged data from the higher frequency antenna and the lower frequency antenna. The depth range of this transition zone may be varied based on optimal depth range of each antenna, such as manually by a viewer viewing the visual output, which may occur in real-time, that is, while operating the radar and viewing the visual output thereof. Or, the transition depth range and/or width of the transition region may be varied as part of post-processing. Post-processing, for purposes of this disclosure, is defined as a time after all data used to produce the visual output has been collected. Real-time processing is defined as processing as the data is received, but is merged before being displayed on the visual output.

The depth range of the transition region may be varied automatically, based on a detected amount of disjoined data per unit area in each output of each antenna, and/or based on a determined noise floor, and/or based on closeness of matching of data received from each antenna within a transition range. In this manner, the depth range is re-calculated as the scanning progresses. This may lead to having a non-linear transition region, which may include a different starting depth and/or ending depth of the transition region.

Still further, it should be understood that any number of antennas may be used, each having a different optimal frequency range, with a transition depth range exhibited in the visual output between exhibition from each antenna.

In a method of processing ground-penetrating radar measurements, one simultaneously transmits and receives a signal using at least two antennas, determines a depth range at which each received signal for each antenna is best (or "optimal", as used in the detailed description), compared to received signals of other antennas, and displays a combined and continuous visual output of depth. The display has part of a visual output from each determined best depth range and at least one transition region comprising a transitioned output between two best depth ranges.

Further features of the device, described above, are also applicable to the method of use.

DETAILED DESCRIPTION OF EMBODIMENTS OF THE DISCLOSED TECHNOLOGY

In an embodiment of the disclosed technology, a visual output of data from a ground-penetrating radar is displayed on a visual medium. The display has a first exhibition of output from a higher frequency range antenna, a second exhibition of output from a lower frequency range antenna (compared to the other antenna; see definition in the "detailed description"), and a transition area between the first and second exhibition having merged data from the lower frequency antenna and the higher frequency antenna. The depth range of the transition area may be varied based on optimal depth range of each antenna, such as manually by a viewer viewing the visual output, which may occur in real-time, that is, while operating the radar and viewing the visual output thereof. Or, the transition depth range and/or width of the transition region may be varied as part of post-processing.

Figure 1:
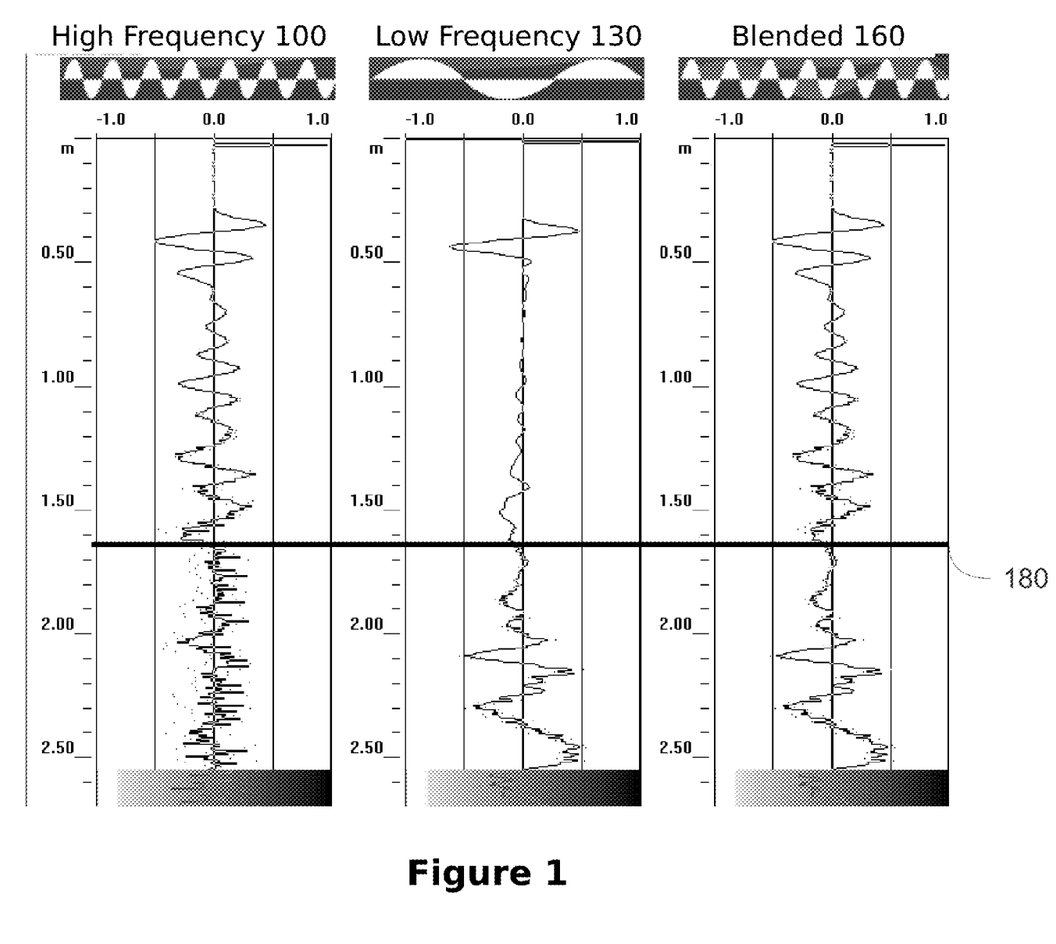
FIG. 1 shows sample output graph of data generated by two ground-penetrating radar antennas, in an embodiment of the disclosed technology.

FIG. 1 shows sample output of data generated by two ground-penetrating radar antennas, in an embodiment of the disclosed technology. The high frequency output 100 is shown on the left graph, the low frequency output 130 is shown in the middle graph, and a blended output 160 is shown in the graph on the right. The y-axis is measured in depth in meters, and the x-axis is the signal amplitude at each depth location. "High" or "higher" frequency and "low" or "lower" frequency are defined relative to each other. That is, when two antennas are used or claimed, it is to be understood that the "high" or "higher" frequency antennas is higher than the "low" or "lower" frequency antennas. An antenna used may be capable of measuring over the entire frequency range, however, a "high" or "low" frequency antenna, for purposes of this disclosure, is one that measures best at a higher or lower frequency band compared to another antenna used in a GPR system.

Thus, for example, GPR is often used in the range/band of 300 to 900 Mhz. A "higher" frequency antenna would be optimized (defined as producing the most precise resulting measurements, compared to other antennas used in conjunction to produce a graphical output) at the highest of the frequencies, in this example, at 900 Mhz and in the vicinity thereof (such as covering 10%, 25%, or 50% of the band, from the top). A "lower" frequency antenna would be optimized (defined, again, as producing the most precise resulting measurements, compared to other antennas used in conjunction to produce a graphical output), at the lowest of the frequencies. In this example, the lower frequency antenna would be optimized (produce a better result) at 300 Mhz and in the vicinity thereof. Similarly, a plurality of antennas, being used simultaneously or one after another, may be used to measure in other bands such as between 900 Mhz to 3000 Mhz for concrete, 10 Mhz to 400 Mhz for geological surveys, or 400 to 5000 Mhz in the transportation industry. In one embodiment, the disclosed technology is limited to impulse-type antennas.

Referring back to FIG. 1, it can be seen that the higher frequency antenna 100 has the most accurate (defined as optimal or precise) measurements at a range of 0 to about 1.6 meters in depth. Below this depth, the output of the high frequency antenna 100, in this example, is mostly noise. The lower frequency antenna 130, however, has the most accurate measurements at depths below about 1.6 meters. A blended graph 160 places the output of data generated from the higher frequency GPR antenna above transition depth point 180, and the output of data generated from the lower frequency GPR antenna below transition depth point 180. The transition depth point 180 is a depth defined where a center point of a transitional merger between output of two different antennas is located. As will be seen in the later figures, the transitional merger range of depth, or transition area of the graph, may vary in size (range of depth) based on a variety of factors. Here, one may simply view the graphs, and use a software implemented program, such as in conjunction with a mouse or touch screen and commands carried out by a processor, to move the line 180 up and down, and increase or decrease the transition area size. This manipulation of the line 180 may be done in real-time, while collecting GPR data, or after the data has been collected as part of post-processing. The transition area and methods of determining same is discussed in greater detail below.

Figure 2A:
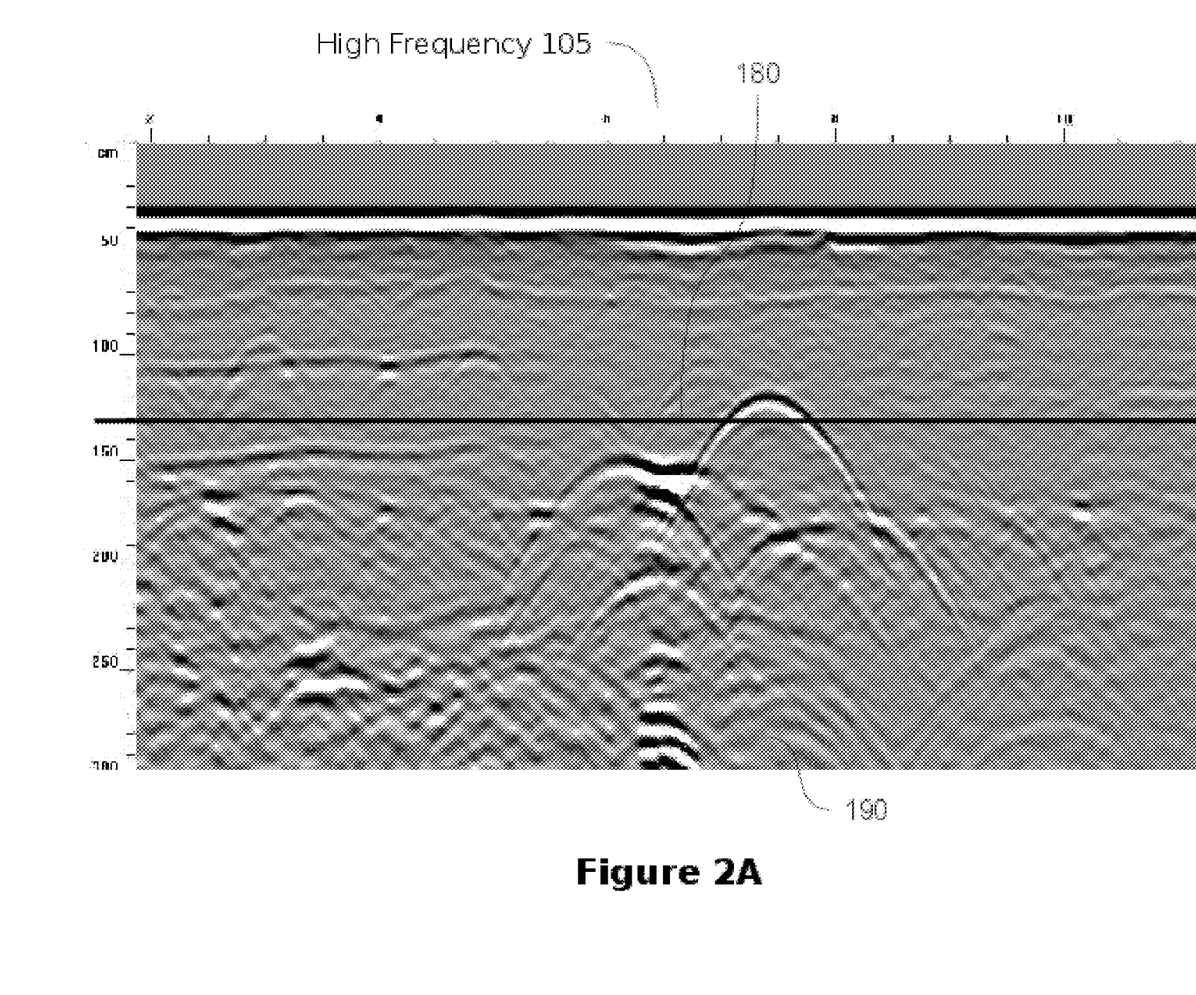
FIG. 2A shows an actual image generated using GPR with a high frequency antenna.
Figure 2B:
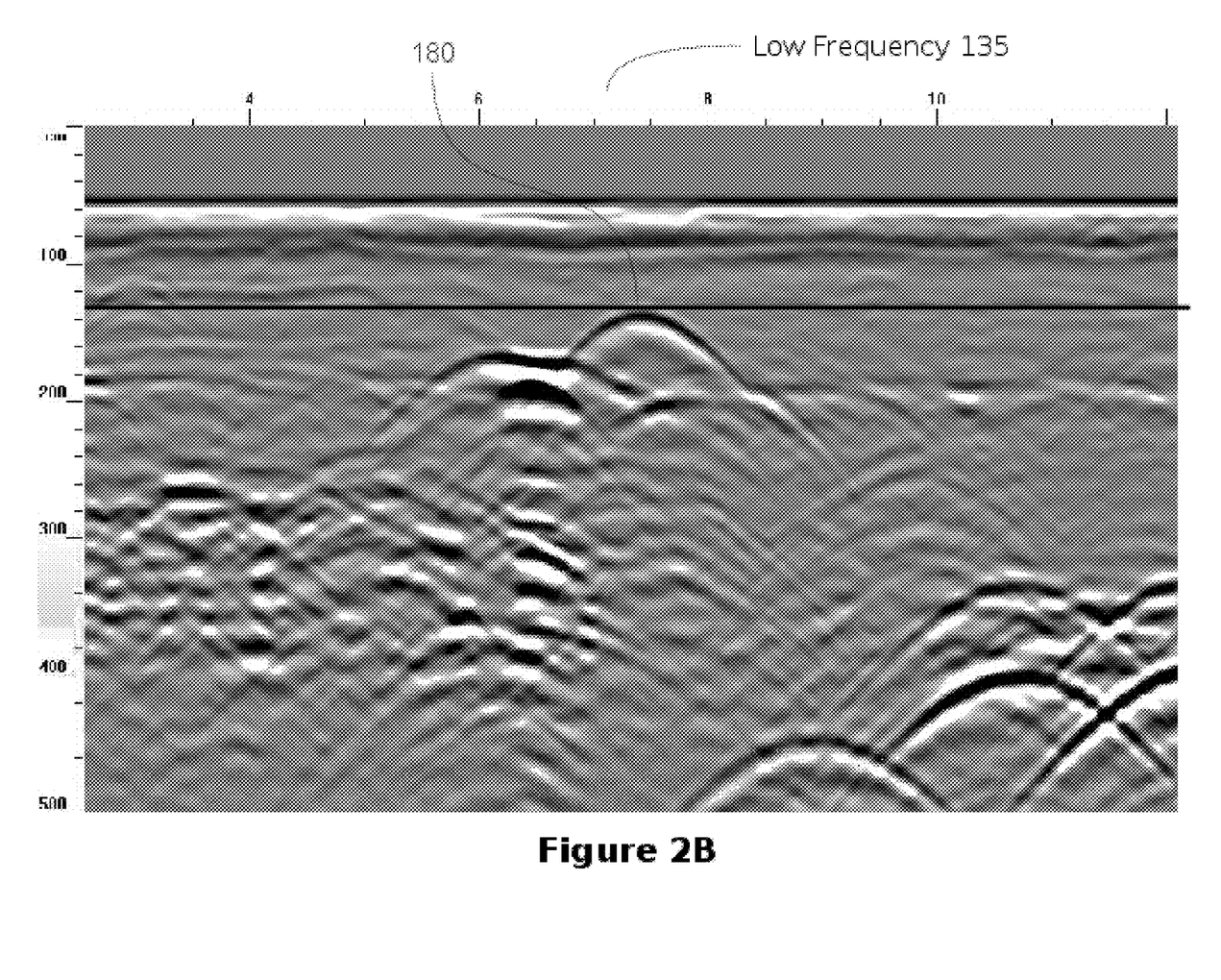
FIG. 2B shows an actual image generated using GPR with a low frequency antenna.

FIG. 2A shows an actual graph generated using GPR with a high frequency antenna. FIG. 2B shows an actual graph generated using GPR with a low frequency antenna. The graph from the high frequency antenna 105 shows much more data at smaller depths than the graph from the low frequency antenna 135. The low frequency antenna 135 graph, however, has clearer (more precise) data at lower depths. Again, this is obvious to the naked eye, and as such, a user may indicate a depth for the center of the transition region 180. However, this may also be determined by knowing in advance the parameters of an antenna being used and pre-defining its best ranges. For example, the high frequency antenna may be pre-defined, based on known characteristics to be used from 0 m downwards with a lower depth of not less than 1.5 m and not more than 2 m. The lower frequency antenna may be programmed between not less than 1.6 m to a depth of infinity.

When using these two antennas together, the maximum depth of the first antenna and the minimum depth of the second antenna may be averaged, or a preferred transition range may be specified. The user may simply select an antenna profile to use, from a pre-populated list of antennas associated with various antennas. Such a pre-populated list may further be modified based on usage—that is, the transition point previously selected by a user. Similarly, this method or combination thereof may be employed when using three or more antennas. Between each exhibition of data received by way of an antenna, is a transition region showing a merger of data from two graph regions, one for each of two antennas.

While the above methods of determining the transition threshold depth are manual or semi-automated, fully automated techniques are also employed in embodiments of the disclosed technology. A first method involves determining a noise floor for all but the lowest frequency band antenna. In signal theory (and by way of definition, for purposes of this embodiment), the noise floor is the measure of the signal created from the sum of all the noise sources and unwanted signals within a measurement system, where noise is defined as any signal other than the one being monitored and the noise floor is the deepest measured point where noise is within an acceptable range to adequately view the desired data. If the dominant noise is generated within the measuring equipment then this is an example of an instrumentation noise floor, as opposed to a physical noise floor. In FIG. 2A, the noise floor 190 is shown, and at the minimum noise floor depth of around 260 meters, the visual output is no longer of use. As such, the transition region begins, in an embodiment of the disclosed technology, at or above the minimum noise floor depth.

Another method of automatically determining where a transition depth is, and further, transition area where data from two graphs is merged together, involves detecting an amount of disjoined data per unit area in each output of each antenna. This may be determined by viewing the output from a single antenna, converting the plot of the data to digital data, and determining the number of pixels which are a) not adjacent to another other pixel, and b) adjacent to only one other pixel, and c) determining the density of pixels within a square, rectangle, or circle around a lone pixel or pixel, such as with a diameter or length of 2, 4, 6, 8, 10 or 20 pixels. The disjoined data, in a pixel unit area, or density thereof, may be compared to the graphical output in the same region from another antenna. Thus, when viewing FIGS. 2A and 2B at about 1 meter, one will note that in FIG. 2A most of the pixels are joined to others and have a high density, whereas in FIG. 2B, there is much less data. Thus, at 1 meter, the high frequency antenna 105 is more precise. However, at 2 meters, the amount of joined versus disjoined data is comparable between the two antennas. Thus, it may be automatically determined that the readings at this range are okay for both antennas based on pixel density comparisons. At this point, another determination is made which is amount of data. As the graph in FIG. 2B has somewhat more data at 2 meters, in a pre-configured process, it is determined that the low frequency graph 135 should be utilized. Using an iterative process and comparing disjoined pixels and pixel count to determine nose and amount of useful information, it is then a matter of a straight forward statistical calculation to determine placement of the line 180.

Figure 3:
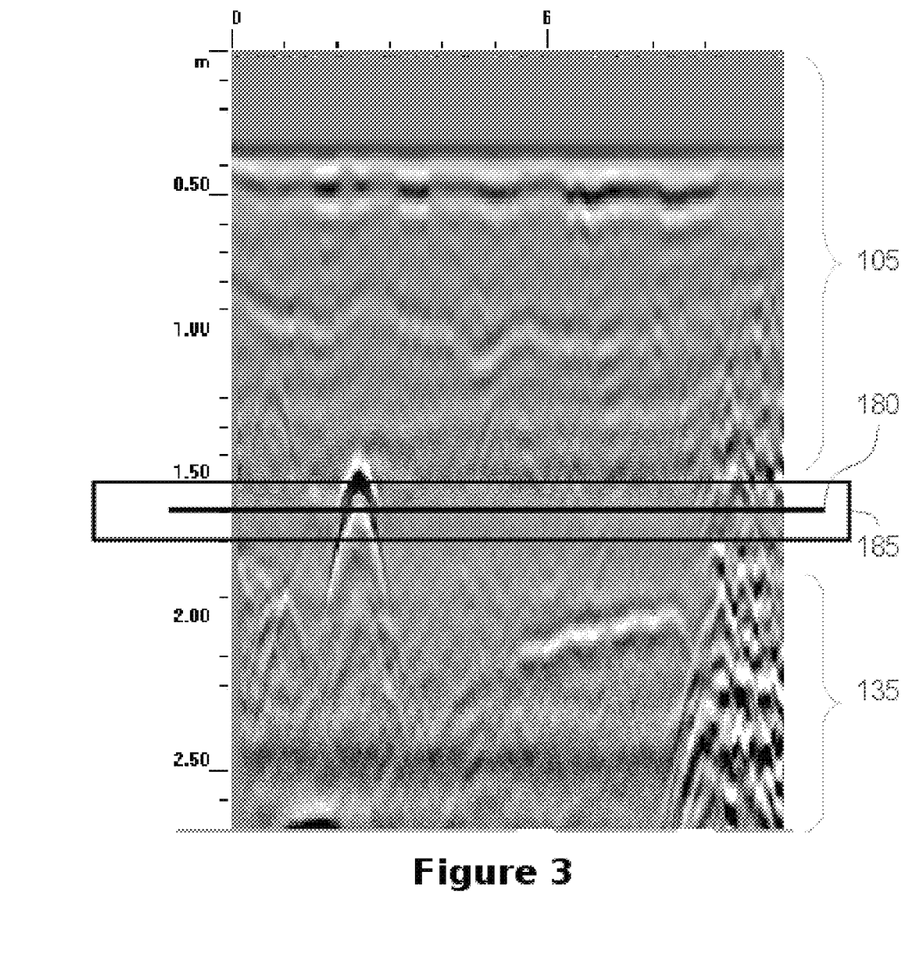
FIG. 3 shows a transition area between two image outputs from two different antennas, in an embodiment of the disclosed technology

FIG. 3 highlights transition area between two graphical outputs from two different antennas, in an embodiment of the disclosed technology. Depth range/graphical output 105 is the same as part of the output shown in FIG. 2A, while depth range/graphical output 135 is the same as part of the output shown in FIG. 2B. That is, this figure shows the merger of the two graphical outputs, split at around 1.6 m. In order to provide a continuous image, there is an area of merger around the central transition line 180 (corresponding to line 180 in the prior figures). The size of transition area may be predefined, such as 2%, 5%, or 10% of the total graph or total size of two antenna depth ranges when using three or more antennas. Again, a user may choose to modify the size of the transition region, in real-time or part of post processing. Alternatively, based on the statistical analysis described with reference to FIGS. 2A and 2B, an optimal transition range may be determined where differences between output 105 and output 135 vary the least. The data outputted in the transition region 185 may then be blended together (defined as varied by software data tools sending commands to a processor to determine which groupings of pixels or lines of pixels are close enough together to move, as little as possible, to join lines and groupings of pixels into a fluid path with one another, and/or deleting or tapering off lines of pixels which would abruptly end when joining to output from another antenna).

Figure 4A:
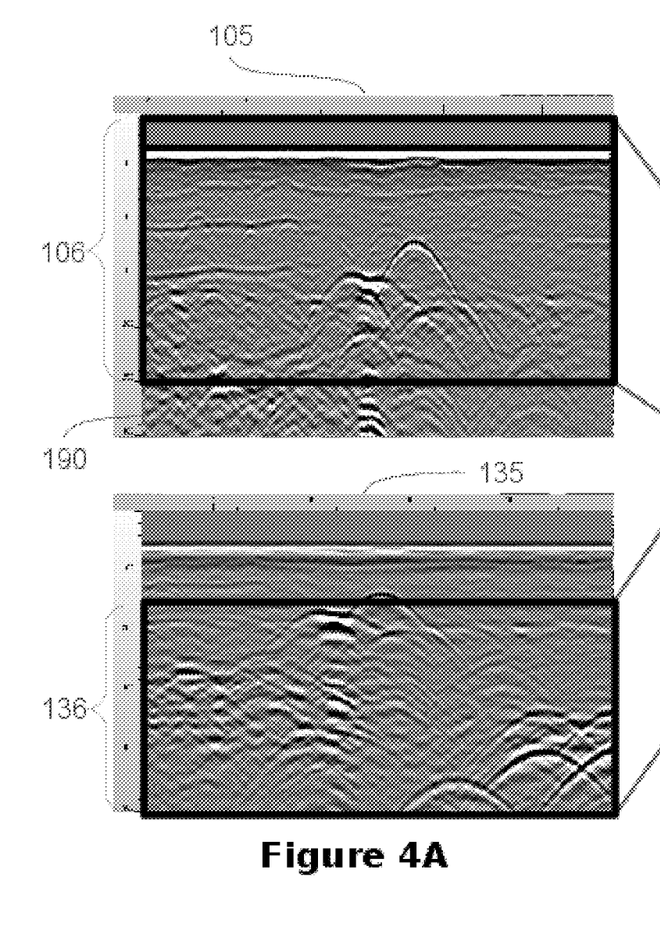
FIG. 4A shows which portions of two image outputs are used to form a merged graphical output, in an embodiment of the disclosed technology.
Figure 4B:
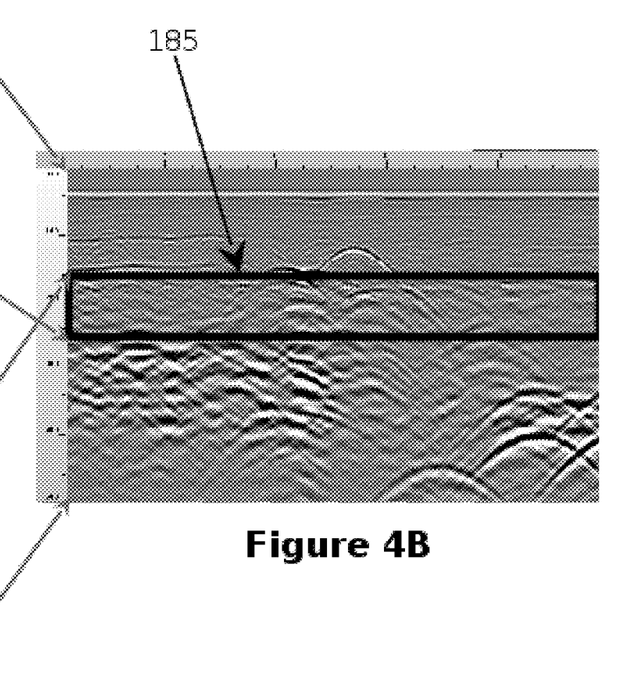
FIG. 4B shows a merged image output, including a transition region, using the graphical outputs shown in FIG. 4A, in an embodiment of the disclosed technology.

FIG. 4A shows which portions of two graphical outputs are used to form a merged graphical output, in an embodiment of the disclosed technology. FIG. 4B shows a merged graphical output, including a transition region, using the graphical outputs shown in FIG. 4A, in an embodiment of the disclosed technology. Here, in FIG. 4A, a depth range is deleted as shown in selected region 106 of the output 105. Based on a merger or joining of bottom pixels 106 of region 105 and top pixels 136 of region 135 (those regions in the box 185 on FIG. 4A), a transition region 185 is created in FIG. 4B, corresponding to the deleted region of FIG. 4A. Note that, in this embodiment, the selected region 106 of output 105 is that which is above and outside the depth range of the noise floor 190, in order to exclude the noise floor and anything beneath this floor in the merged output. Though sometimes slightly blurry in output, a continuous graphical output over the regions 106 (the portion of output 105 selected for the merged output) and 136 (the portion of output 135 selected for the merged output), from two antennas, is created producing a result more clear and precise than either antenna could provide alone.

Another method of determining transition position and range is overlap in measurements between output from two antennas. This, in turn, determines which portions (e.g. 106 and 136) of the outputs are used in the merged display. For example, a statistical sampling or comparison may be taken at regular intervals between two antennas, such as for example every 0.5 meters, 1 meter, or 2 meters in depth. If the output is exceedingly different (defined as more than 25% different) one may conclude (manually or automatically) that one is measuring at a depth which is optimal for only one antenna. However, if the output is exceedingly similar (defined as more than 90% identical or statistically similar where statistically similar is defined as within 2 pixels of each other, then one may conclude that this is a potentially optimal depth for two antennas. Since the matching is close, or closest, this depth may be used as a center of a transition region, such as region 185 as the merged data will roughly overlap, resulting in a smooth picture.

Figure 5A:
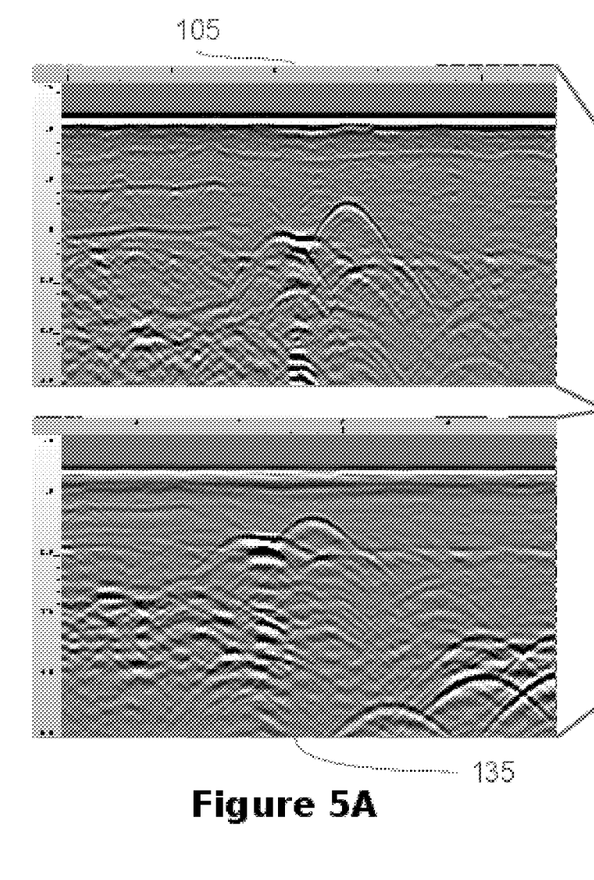
FIG. 5A shows a clean version of the two image outputs used to form a merged graphical output, of FIG. 4A.
Figure 5B:
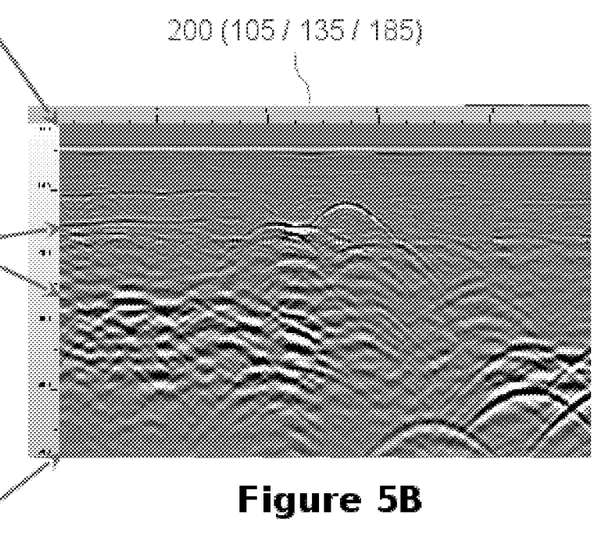
FIG. 5B shows a clean version of the merged image output of FIG. 4B.
Figure 6:
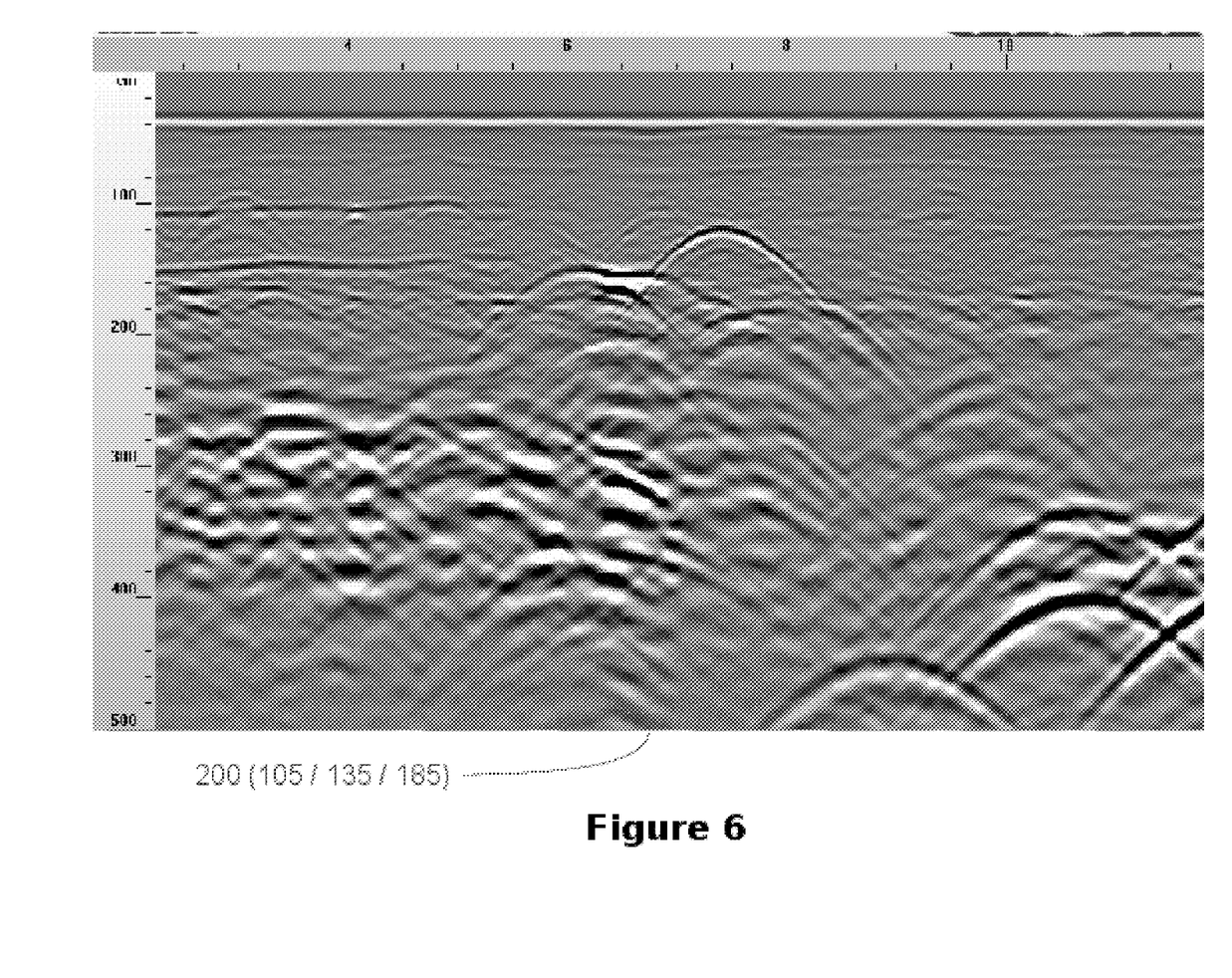
FIG. 6 shows output of a merged image output, of an embodiment of the disclosed technology.

FIG. 5A shows a clean version of the two graphical outputs used to form a merged graphical output, of FIG. 4A. FIG. 5B shows a clean version of the merged graphical output of FIG. 4B. FIG. 6 shows output of a merged graphical output, of an embodiment of the disclosed technology. In these figures, one can appreciate the two visual outputs of FIG. 5A obtained with two different antennas produce output 105 and 135 respectively. By taking the best view of each (the "upper" portion of output 105, which is the top portion, as shown, and the "lower" portion of 135, which is the bottom portion, as shown), in embodiments of the disclosed technology, a new output 200 is formed. This new output 200 is comprised of parts of the output from a first output 105, second output 135, and merged region 185.

FIG. 6 shows output of a merged graphical output, of an embodiment of the disclosed technology. The merged output 200 shows the clearest output across all depth regions.

Figure 7:
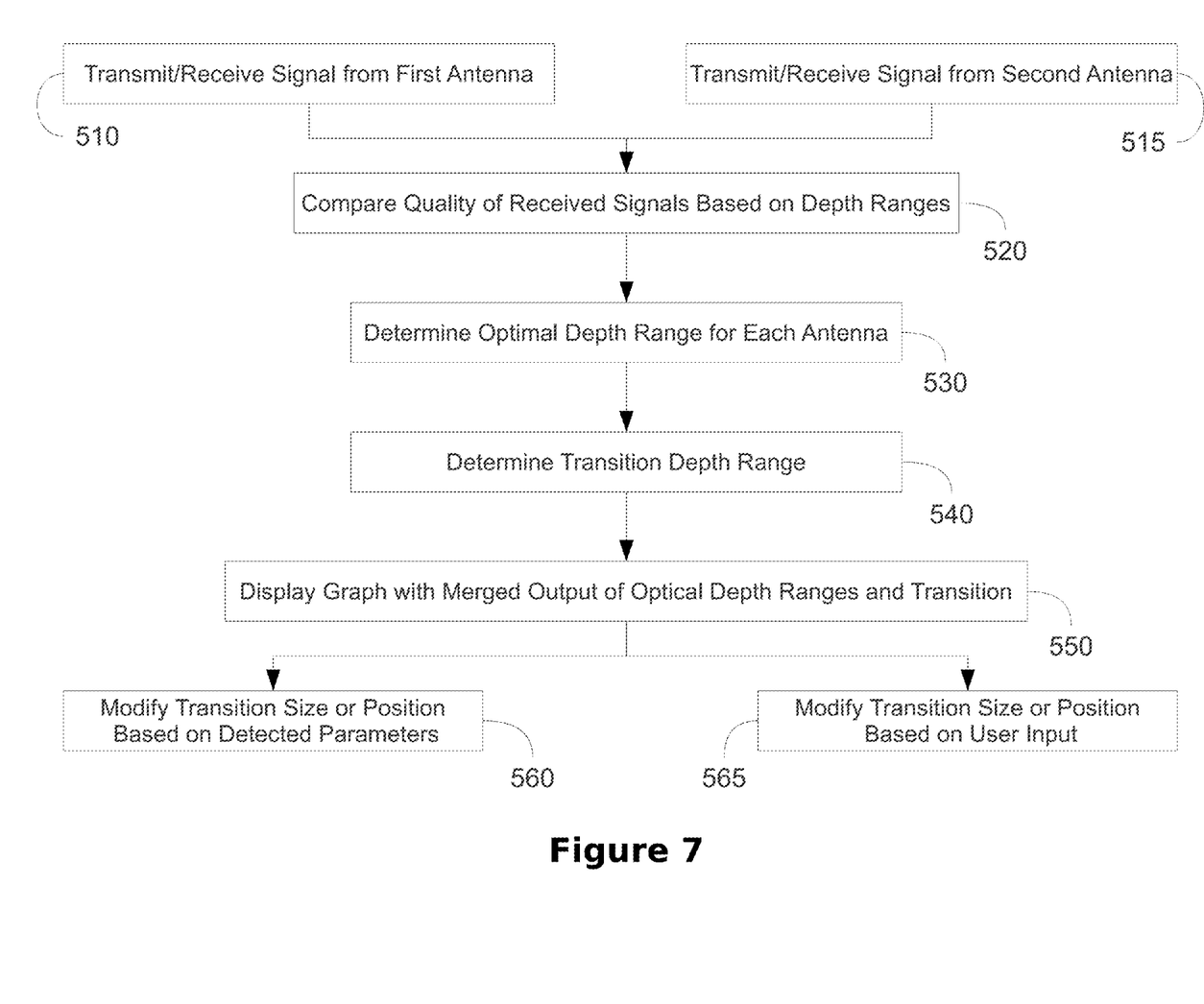
FIG. 7 is a high-level flow chart of steps taken to produce a graphical GPR output in embodiments of the disclosed technology.

FIG. 7 is a high-level flow chart of steps taken to produce a graphical GPR output in embodiments of the disclosed technology. In step 510, a signal is transmitted and received from a first antenna, and in 515, likewise from a second antenna. Each of the two antennas may have a transmitter and/or a receiver. Of all the antennas used, there must be at least one transmitter and at least one receiver, and at least two combinations of transmitter and receiver so that two different data sets are produced. The transmitter and receiver, on a single antenna, may be two different electrically coupled physical devices, or may be the same physical device on the antenna. While two antennas are used in FIG. 5, it should be understand that at least two antennas are used, and the method may proceed similarly with three, four, five, or more antennas.

In step 520, the quality of the received signals is compared based on the signal at various depth ranges. As described above, this may be accomplished manually (by viewing the output), but semi-automated mechanisms (such as based on inputted or detected information about each antenna), or by fully automated mechanisms (such as by determining a noise floor and/or determining dis-joined or erroneous pixel density). As such, optimal depth ranges for each antenna are determined in step 530, and then a transition depth range is determined in step 540. The transition depth range is the starting and ending depth where graphically outputted data is merged (based off of) output from two antennas, one being shown at a shallower depth than the transition depth range, and one being shown at a deeper depth than the transition depth range. The transition depth range thus includes output from two different antennas, merged together. The number of transition depth ranges is equal to the number of antennas used to produce the graphical output minus one.

Referring to steps 530 and 540, in an example where three antennas are used, a first antenna may be determined to have an optimal depth range of 0 to 2 meters. A second, from 2 to 10 meters. A third, from 10 to 20 meters. A transition range between each of these depths be set by any one of, or a combination of, pre-setting or selecting a depth range, making such a determination based on aesthetic overlap of the graphs, optimizing for as much unmerged depth ranges as possible, and/or where noise and artifacts are most prominent for both antennas bordering the transition depth range). An example where a first transition depth range is 2 meters and a second transition depth range is 10 meters, then output, as follows, would be displayed, in step 550:

| | |
|---|---|
| 0-1.8 meters | first antenna |
| 1.8-2.2 meters | first transition |
| 2.2-9.5 meters | second antenna |
| 9.5-10.5 meters | second transition |
| 10.5-20 meters | third antenna |

Referring again to step 550, a graphical output is displayed with merged output of optimal depth ranges and transition ranges. Then, in step 565, a user may decide to modify the transition size or position based on detected parameters, such as, based on viewing the output and deciding to adjust same with a slider. Or, in step 560, the transition size or position may be modified based on detected parameters, such as described above, based on determined dis-joined data and so forth.

It should be understood that the radar data may be acquired by two antennas which are co-located, or by two physically connected antennas which are not co-located (that is, they are located at two different places but combine electrically or through post-processing to arrive at a better received signal for a particular position). Multiple antennas may also be moved over a target area, at different times such as sequentially within a short time span, so long as the data received overlaps within an acceptable tolerance level at a particular depth range, so that a transition range for the display may be determined by one of the methods described herein-above.

Figure 8:
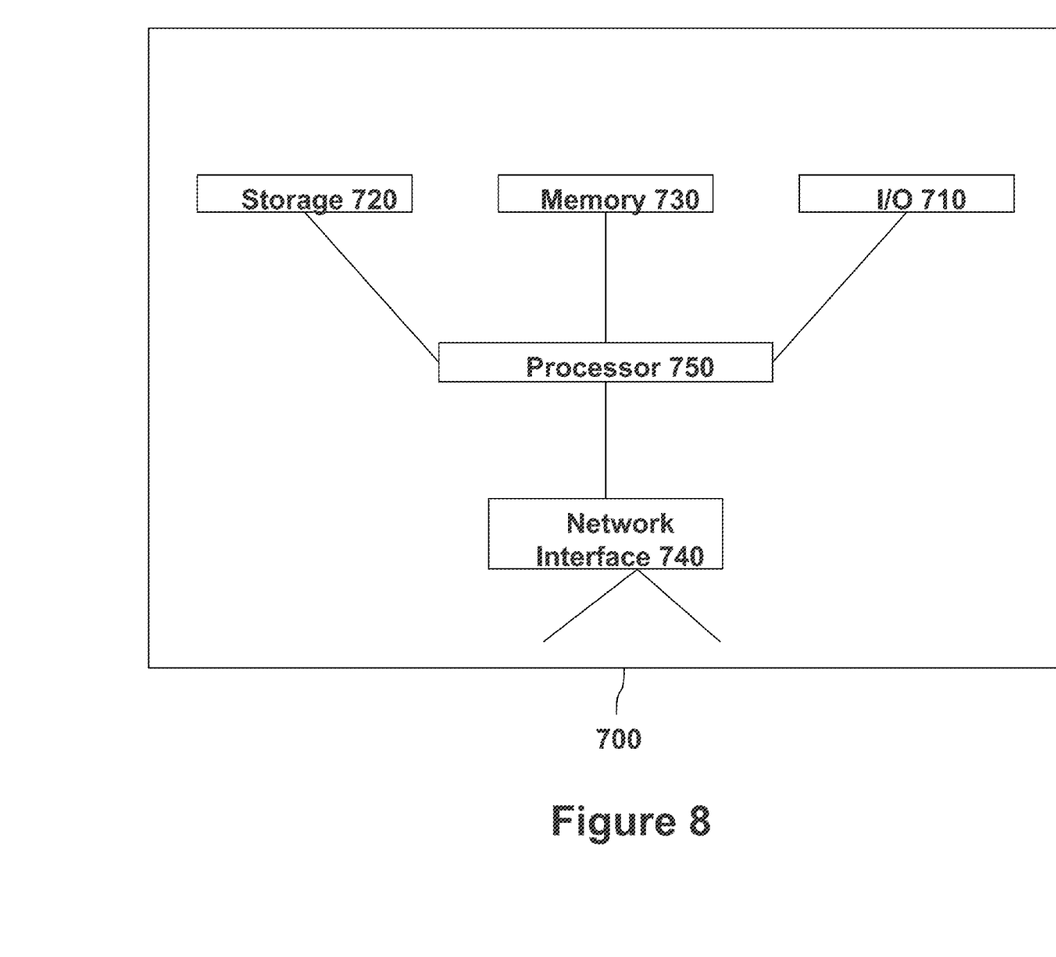
FIG. 8 shows a high-level block diagram of a device that may be used to carry out the disclosed technology.

FIG. 8 shows a high-level block diagram of a device that may be used to carry out the disclosed technology. Device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A device 700 also includes one or a plurality of input network interfaces for communicating with other devices via a network (e.g., the internet). A device 700 also includes one or more output network interfaces 710 for communicating with other devices. Device 700 also includes input/output 740 representing devices which allow for user interaction with the computer 700 (e.g., display, keyboard, mouse, speakers, buttons, etc.). One skilled in the art will recognize that an implementation of actual devices will contain other components as well, and that FIG. 7 is a high level representation of some of the components of such a measurement device for illustrative purposes. It should also be understood by one skilled in the art that the method and devices depicted in FIGS. 1 through 5 may be implemented on a device such as is shown in FIG. 6.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only illustrative and not restrictive. All changes that come within the meaning and range of equivalency of the claims are to be embraced within their scope. Combinations of any of the methods, systems, and devices described hereinabove are also contemplated and within the scope of the invention.

I claim:

1. A visual output of data from a ground-penetrating radar, displayed on a visual display, said display exhibiting a visual output of data comprising:
   a first exhibition of output from an optimal depth range of a higher frequency range antenna;
   a second exhibition of output from an optimal depth range of a lower frequency range antenna;
   a graphical output exhibiting data from said optimal depth ranges of each of said first and second exhibitions merged into a continuous image at a transition area exhibited between each of said first and second exhibitions produced from data from both said lower frequency antenna and said higher frequency antenna.

2. The visual output of claim 1, wherein a position and size of said transition area is determined based on said optimal depth range of each said antenna.

3. The visual output of claim 2, wherein said depth range of said first exhibition, said second exhibition, and said transition area are varied manually by a viewer of a first said visual output, creating a second visual output.

4. The visual output of claim 3, wherein said depth range of at least one of said first exhibition, said second exhibition, and said transition area is varied in real-time, while operating said radar and viewing said visual output thereof.

5. The visual output of claim 2, wherein said depth range of at least one of said first exhibition, said second exhibition, and said transition is varied after data said visual output is displayed, as part of post-processing of said data.

6. The visual output of claim 2, wherein said depth range of at least one of said first exhibition, said second exhibition, and said transition is varied automatically, based on a detected amount of disjoined data per unit area in each said output of each said antenna.

7. The visual output of claim 6, wherein said depth range is varied based on a determined noise floor of at least one said antenna.

8. The visual output of claim 1, further comprising a third exhibition of output from a third antenna, having a second said transition area between said second exhibition and said third exhibition.

9. The visual output of claim 1, wherein transmission or receiving using said higher frequency and said lower frequency range antennas occurs simultaneously.

10. The visual output of claim 1, wherein a position of said transition depth range is determined based on closeness of matching of data received from each antenna within a depth range.

11. A method of processing ground-penetrating radar measurements, comprising the steps of:
simultaneously transmitting and receiving a signal using at least two antennas;
determining a depth range at which each said received signal for each said antenna is optimized, compared to received signals of other said antennas;
displaying a combined and continuous visual output of depth, said displaying comprising:
part of a visual output from each said determined optimized depth range of each said antenna; and
at least one transition region comprising a transitioned output between two said best optimized depth ranges.

12. The method of claim 11, wherein each antenna of said at least two antennas measures at a different frequency band, and each said antenna produces a different optimized depth.

13. The method of claim 11, wherein said transition region comprises an outer range of a said optimized depth for two antennas.

14. The method of claim 13, wherein a depth range for exhibiting said transition region is determined manually by a viewer of said output.

15. The method of claim 13, wherein said transition region further comprises imprecise frequency bands of measurement for at least two said antennas and said imprecise frequency band of each said antenna overlap each other.

16. The method of claim 11, wherein said transition region is determined automatically based on a determination of a detected concentration of disjoined data for each depth range measured from two said antennas of said at least two antennas.

17. The method of claim 16, wherein a maximum depth range of said transition region is pre-defined based on known properties of each said antenna.

18. The method of claim 11, wherein said steps of determining and displaying are carried out as part of post-processing.

19. The method of claim 11, wherein said optimal depth range is determined based on a determined noise floor of at least one said antenna.

20. The method of claim 11, wherein said transition region is determined based on closeness in overlap of visual output from two said antennas.

* * * * *